United States Patent
Owechko (10) Patent No.: US 10,755,141 B2
(45) Date of Patent: Aug. 25, 2020

(54) STREAMING DATA TENSOR ANALYSIS USING BLIND SOURCE SEPARATION

(71) Applicant: HRL Laboratories, LLC, Malibu, CA (US)

(72) Inventor: Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/298,367

(22) Filed: Mar. 11, 2019

(65) Prior Publication Data

US 2019/0205696 A1 Jul. 4, 2019

Related U.S. Application Data

(63) Continuation-in-part of application No. 16/127,927, filed on Sep. 11, 2018, and a continuation-in-part of application No. 16/034,780, filed on Jul. 13, 2018.
(Continued)

(51) Int. Cl.
*G06K 9/62* (2006.01)
*G06F 17/16* (2006.01)
(Continued)

(52) U.S. Cl.
CPC .............. *G06K 9/624* (2013.01); *B60W 30/09* (2013.01); *G06F 17/12* (2013.01); *G06F 17/16* (2013.01);
(Continued)

(58) Field of Classification Search
CPC ............... G06K 9/624; G06K 9/00805; G06K 9/00986; G06K 9/6242; G06K 9/6288; G06W 30/09; G06F 17/12; G06F 17/16
See application file for complete search history.

(56) References Cited

U.S. PATENT DOCUMENTS 8,204,988 B2  6/2012  Lin et al.
9,668,066 B1 *  5/2017  Betts ................ H04R 25/40
(Continued)

FOREIGN PATENT DOCUMENTS

WO  WO2017-044082 A1  3/2017
WO  WO 2017/111832  *  6/2017
(Continued)

OTHER PUBLICATIONS

Vervliet et all, "Canonical polyadic decomposition", https://www.tensorlab.net/doc/cpd.html, last updated on May 9, 2017 accessed Jul. 15, 2019.*
(Continued)

*Primary Examiner* — Catherine T. Rastovski
(74) *Attorney, Agent, or Firm* — Tope-McKay & Associates (57) ABSTRACT

Described is a system for controlling a device based on streaming data analysis using blind source separation. The system updates a set of parallel processing pipelines for two-dimensional (2D) tensor slices of streaming tensor data in different orientations, where the streaming tensor data includes incomplete sensor data. In updating the parallel processing pipelines, the system replaces a first tensor slice with a new tensor slice resulting in an updated set of tensor slices in different orientations. At each time step, a cycle of demixing, transitive matching, and tensor factor weight calculations is performed on the updated set of tensor slices. The tensor factor weight calculations are used for sensor data reconstruction, and based on the sensor data reconstruction, hidden sensor data is extracted. Upon recognition of an object in the extracted hidden sensor data, the device is caused to perform a maneuver to avoid a collision with the object.

18 Claims, 9 Drawing Sheets

Related U.S. Application Data (60) Provisional application No. 62/684,364, filed on Jun. 13, 2018, provisional application No. 62/624,054, filed on Jan. 30, 2018, provisional application No. 62/558,094, filed on Sep. 13, 2017.

(51) Int. Cl.
  G06F 17/12 (2006.01)
  G06K 9/00 (2006.01)
  B60W 30/09 (2012.01)

(52) U.S. Cl.
  CPC ..... G06K 9/00805 (2013.01); G06K 9/00986 (2013.01); G06K 9/6242 (2013.01); G06K 9/6288 (2013.01)

(56) References Cited

U.S. PATENT DOCUMENTS

| | | |
|---|---|---|
| 2011/0288379 A1 | 11/2011 | Wu |
| 2015/0296214 A1 | 10/2015 | Mahfoodh et al. |
| 2016/0358107 A1 | 12/2016 | Kokkinis |
| 2017/0168991 A1 | 6/2017 | Baskaran et al. |
| 2018/0293691 A1* | 10/2018 | Nurvitadhi ............ G06F 9/3001 |
| 2019/0080210 A1 | 3/2019 | Owechko |

FOREIGN PATENT DOCUMENTS

| | | | |
|---|---|---|---|
| WO | WO2017-111832 A1 | | 6/2017 |
| WO | WO 2017/111832 | * | 9/2017 |

OTHER PUBLICATIONS

Sidiropoulos et al., "Tensor decomposition for signal processing and machine learning," IEEE Trans. on Signal processing, vol. 65 No. 13, 2017, pp. 3551-3582.*
Cichocki et al., "Tensor decompositions for Signal Processing Applications, From two-way to multiway component analysis", IEEE Signal Processing Magazine (145) 2015.*
Clifford, "Singular Value Decomposition & Independent Component Analysis for Blind Source Separation", Biomedical Signal and Image Processing, 2005.*
Vervliet, et all, "Canonical polyadic decomposition", http://www.tensorlab.net/doc/cpd.html, last updated on May 9, 2017 accessed Jul. 15, 2019.
Kolda and Bader, "Tensor Decompositions and Applications", Sandia Report, Nov. 2007.
Kiers et al, PARAFAC2-Part I. A Direct Fitting Algorithm for the PARAFAC2 Model. Journal of Chemometrics, 13, pp. 275-294, 1999.
N. Sidiropoulos et al. in "Tensor decomposition for signal processing and machine learning," IEEE Trans. on Signal Processing, vol. 65, No. 13, pp. 3551-3582, 2017.
Notification of Transmittal of International Search Report and the Written Opinion of the International Searching Authority for PCT/US2019/021620; dated Jun. 26, 2019.
International Search Report of the International Searching Authority for PCT/US2019/021620; dated Jun. 26, 2019.
Written Opinion of the International Searching Authority for PCT/US2019/021620; dated Jun. 26, 2019.
Guoxu Zhou et al., 'Linked Component Analysis From Matrices to High-Order Tensors: Applications to Biomedical Data', In: Proceedings of the IEEE, vol. 104, Issue 2, Feb. 2016.
A. Harshman in "Foundations of the PARAFAC procedure: Model and conditions for an explanatory multi-mode factor analysis," UCLA Working Papers in Phonetics, vol. 16, 1970, pp. 1-84.
Tomasi in Practical and computational aspects in chemometric data analysis, Ph.D. thesis, Department of Food Science, The Royal Veterinary and Agricultural University, Frederiksberg, Denmark, 2006, pp. 1-286.
N. Sidiropoulos et al. in "Tensor decomposition for signal processing and machine learning," IEEE Trans. on Signal Processing, vol. 65, No. 13, 2017, pp. 3551-3582.
Notification of Transmittal of International Search Report and the Written Opinion of the International Searching Authority for PCT/US2018/042008; dated Nov. 26, 2018.
International Search Report of the International Searching Authority for PCT/US2018/042008; dated Nov. 26, 2018.
Written Opinion of the International Searching Authority for PCT/US2018/042008; dated Nov. 26, 2018.
Office Action 1 for U.S. Appl. No. 16/034,780, dated Jul. 18, 2019.
Acar, et al., Scalable tensor factorizations for incomplete data, Chemometrics and Inteligent Laboratory Systems, 106(1) 2011, pp. 41-56.
Response to Office Action 1 for U.S. Appl. No. 16/034,780, dated Oct. 18, 2019.
Office Action 2 for U.S. Appl. No. 16/034,780, dated Nov. 29, 2019.
Response to Office Action 2 for U.S. Appl. No. 16/034,780 dated Jan. 30, 2020.
Notice of Allowance for U.S. Appl. No. 16/034,780, dated Mar. 20, 2020.
Office Action 1 for U.S. Appl. No. 16/127,927 (Non-TMA), dated Jan. 6, 2020.
Lakmal, et al., "Blind Source Separation in Real Time Using Second Order Statistics," Master of Science thesis, Blekinge Institute of Technology, Sep. 2007.
Yang, et al., "Time-Frequency Filter Bank: A Simple Approach for Audio and Music Separation," IEEE Access, vol. 5, 2017.

* cited by examiner

STREAMING DATA TENSOR ANALYSIS USING BLIND SOURCE SEPARATION

CROSS-REFERENCE TO RELATED APPLICATIONS

This is a Continuation-in-Part Applications of U.S. application Ser. No. 16/034,780, filed in the United States on Jul. 13, 2018, entitled, "Independent Component Analysis of Tensors for Sensor Data Fusion and Reconstruction," which is a Non-Provisional patent application of U.S. Application No. 62/558,094, filed in the United States on Sep. 13, 2017, entitled, "Independent Component Analysis of Tensors for Sensor Data Fusion and Reconstruction," the entirety of which are hereby incorporated by reference.

This is ALSO a Continuation-in-Part Applications of U.S. application Ser. No. 16/127,927, filed in the United States on Sep. 11, 2018, entitled, "Mixed Domain Blind Source Separation for Sensor Array Processing," which is a Non-Provisional patent application of U.S. Application No. 62/624,054, filed in the United States on Jan. 30, 2018, entitled, "Mixed Domain Blind Source Separation for Sensor Array Processing," the entirety of which are hereby incorporated by reference.

This is ALSO a Non-Provisional Applications of U.S. Provisional Application No. 62/684,364, filed in the United States on Jun. 13, 2018, entitled, "Streaming Data Tensor Analysis Using Blind Source Separation," the entirety of which is incorporated herein by reference.

BACKGROUND OF INVENTION

(1) Field of Invention

The present invention relates to a system for revealing hidden structures in data and, more particularly, to a system for revealing hidden structures in streaming data using tensor decomposition.

(2) Description of Related Art

Tensor rank decomposition is a generalization of the matrix singular value decomposition to tensors. A tensor is a generalization of matrices to higher dimensions, in other words it is a multi-dimensional table of data values. The current state-of-the-art for tensor decomposition are methods based on least squares fitting of data to the model. Examples include PARAllel FACtor analysis (PARAFAC) described by Kiers et al. in "PARAFAC2-Part I. A Direct Fitting Algorithm for the PARAFAC2 Model," Journal of Chemometrics, 13, 275-294, 1999 and Alternating Least Squares (ALS), which is described by N. Sidiropoulos et al. in "Tensor decomposition for signal processing and machine learning," IEEE Trans. on Signal Processing, Vol. 65, No. 13, 2017. Each of the aforementioned references are incorporated by reference as though fully set forth herein. These methods do not scale to higher dimensional tensors and do not handle sparse data well because gradients cannot be computed accurately when the data is sparse.

U.S. application Ser. No. 16/034,780, which is hereby incorporated by reference as though fully set forth herein, describes Independent Component Analysis of Tensors (ICAT), which is a processing method for tensors with applications in sensor data fusion and reconstruction. A tensor is a generalization of matrices to higher dimensions, in other words it is a multi-dimensional table of data values. ICAT is a unique method for decomposing a tensor into a sum of simpler component tensors formed from basis vectors that reveal hidden patterns in the data.

Many big data analysis problems, such as detection of malicious activities on data networks, require analysis of streaming data in real-time. Thus, a continuing need exists for a system for revealing hidden patterns in the data using modifications of ICAT that enable the system to handle streaming data.

SUMMARY OF INVENTION

The present invention relates to a system for revealing hidden structures in data and, more particularly, to a system for revealing hidden structures in streaming data using tensor decomposition. The system comprises one or more processors and a non-transitory computer-readable medium having executable instructions encoded thereon such that when executed, the one or more processors perform multiple operations. At each time step, the system updates a set of parallel processing pipelines for two-dimensional (2D) tensor slices of streaming tensor data in different orientations, wherein the streaming tensor data comprises incomplete sensor data. In updating the set of parallel processing pipelines, a first tensor slice is replaced with a new tensor slice resulting in an updated set of tensor slices in different orientations. At each time step, the system performs a cycle of demixing, transitive matching, and tensor factor weight calculations on the updated set of tensor slices. The tensor factor weight calculations are used for sensor data reconstruction, and based on the sensor data reconstruction, hidden sensor data is extracted. Upon recognition of an object in the extracted hidden sensor data, the system causes the device to perform a maneuver to avoid a collision with the object.

In another aspect, in performing the cycle of demixing, transitive matching, and tensor factor weight calculations, the system processes the tensor slices into demixed outputs; converts the demixed outputs back into tensor slices and decomposes the tensor slices into mode factors using matrix decomposition; repeats operations of processing the tensor slices and converting the demixed outputs until mode factors are determined for all of the tensor modes; assigns the mode factors to tensor factors by matching mode factors common to two or more demixings; uses the assigned mode factors to determine tensor factor weight values; and uses the tensor factor weight values to combine the tensor factors for the sensor data reconstruction.

In another aspect, the tensor factor weight values are determined by setting up a system of linear equations using sensor data and solving for the tensor weight factors.

In another aspect, a rate of demixing is increased by multiplying newly sampled streaming tensor data by a previous demixing matrix.

In another aspect, in updating the set of parallel processing pipelines, the system measures a tensor data matrix at time t over a sliding time window; runs a blind source separation algorithm on the tensor data matrix to obtain a demixing matrix; generates an estimate of tensor mode factors for time t by multiplying the tensor data matrix by the demixing matrix; measures a new tensor data matrix at time t+1; initializes a current solution by multiplying the new tensor data matrix by the demixing matrix; runs a blind source separation algorithm on the current solution to obtain a new demixing matrix; and generates a new estimate of tensor mode factors for time t+1 by multiplying the new tensor data matrix by the new demixing matrix.

In another aspect, the blind source separation algorithm is independent component analysis (ICA).

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for revealing hidden structures in data and, more particularly, to a system for revealing hidden structures in streaming data using tensor decomposition. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for system for revealing hidden structures in streaming data. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
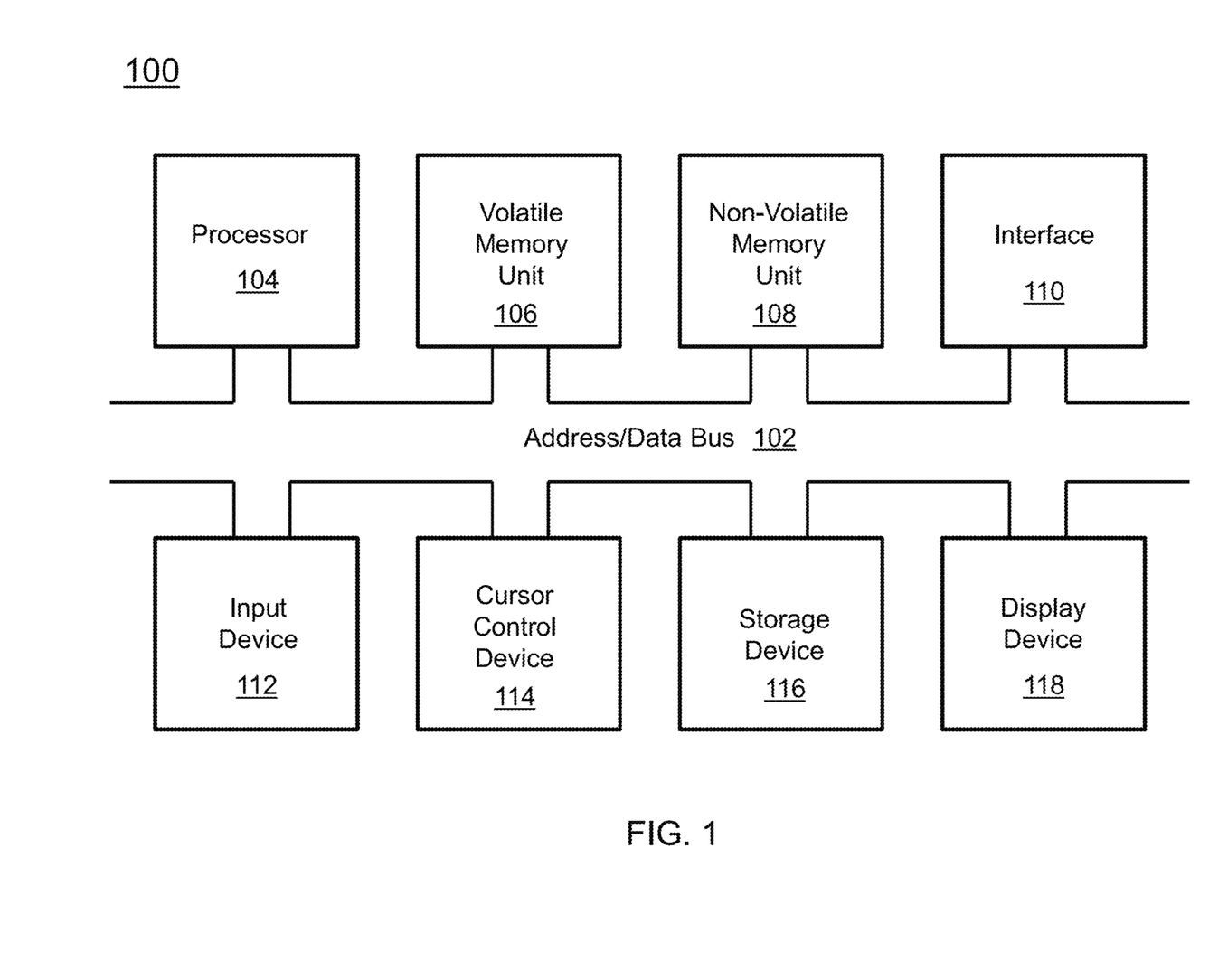
FIG. 1 is a block diagram depicting the components of a system for revealing hidden structures in streaming data according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array ("PLA"), complex programmable logic device ("CPLD"), or a field programmable gate array ("FPGA").

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
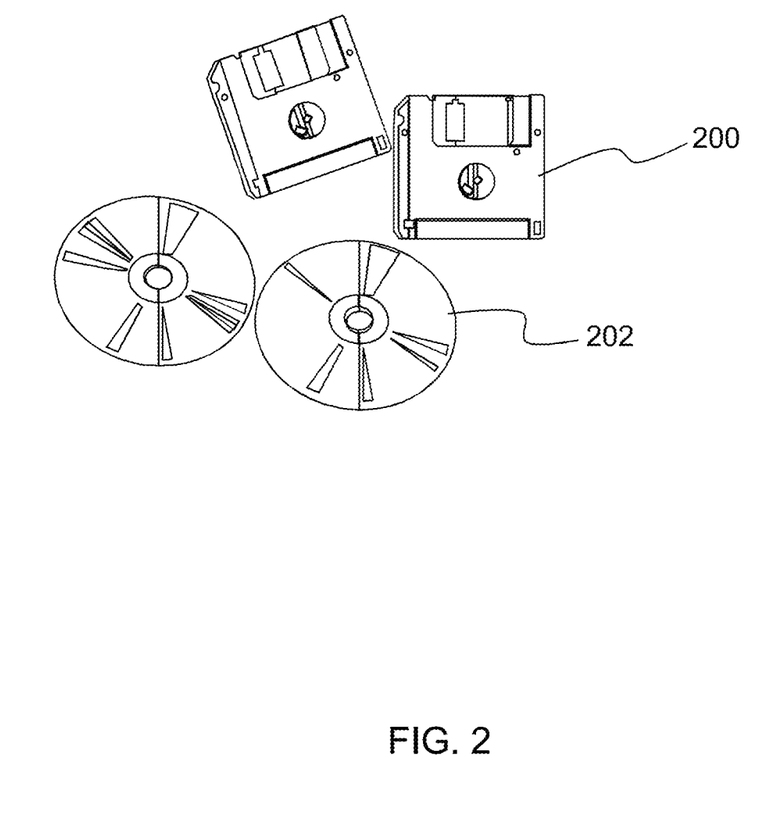
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

Independent Component Analysis of Tensors (ICAT) is a processing method for tensors with applications in sensor data fusion and reconstruction. Non-limiting examples of applications include detection of patterns across multimodal datasets, such as combinations of sensor and social network link data to find groups of actors involved in malicious activities. A tensor is a generalization of matrices to higher dimensions, in other words it is a multi-dimensional table of data values. ICAT, described in U.S. application Ser. No. 16/034,780, is a unique method for decomposing a tensor into a sum of simpler component tensors formed from basis vectors that reveal hidden patterns in the data.

ICAT is very efficient in terms of processing speed and memory usage. The processing speed is faster than existing methods because it does not need to solve an alternating least-squares fitting problem over the entire tensor as current methods do. ICAT is also more memory efficient because the entire tensor doesn't need to fit in memory. The memory requirements scale linearly with the number of tensor dimensions instead of exponentially, which makes processing of tensors with more than three dimensions practical. These properties enable ICAT to perform efficient fusion and reconstruction of multiple sensor data streams if each dimension of the tensor is used to represent a different sensor.

The current state of the art for tensor decomposition includes methods based on least squares fitting of data to the model. These methods are much slower than ICAT, require more memory, and do not scale to higher dimensional tensors. They also do not handle sparse data well, because gradients cannot be computed accurately when the data is sparse. Finally, they are not designed to handle streaming data. Initial experimental studies have demonstrated a speedup of more than fifty times (50×) that of existing methods.

Independent Component Analysis (ICA) has not been used for tensor decomposition before because of the indeterminate ordering and scaling of ICA outputs. ICA performs blind separation of signal mixtures into pure components based on the statistical independence of the components, but since the ordering and scaling of the output components is free to vary, the usual way ICA is used prevents combining the correct groups of ICA outputs into the individual tensor factors.

The ICAT algorithm uses a unique sequence of ICA demixing stages for the tensor dimensions in which each pair of stages have a dimension in common. This enables the linking or matching of ICA components into the correct combinations for each tensor factor. The linking obviates the need for trying every possible combination of ICA outputs to find the correct one. Once the correct combinations have been determined, a simple system of linear equations can be solved to determine the correct scaling of each tensor factor.

An important requirement for sensing systems involving multiple sensors is the ability to extract weak signals from mixtures with other ambient signals and fill in missing data. The system described herein meets this requirement using a sensor fusion framework based on modeling the relationships between sensor signals and different contexts using a tensor representation. The system analyzes the tensor using ICAT. The dimensions, or modes, of the tensor are used to represent both sensor data and contextual conditions, such as time-of-day, geographic location, signals from other sensors, and so on. The tensor element values represent the relationships between signals and contexts. Tensor decomposition can then reveal the hidden structure in the relationships which, in turn, can be used to extract weak signals and predict or fill-in missing sensor data. In the system according to embodiments of the present disclosure, ICAT is extended to handle streaming data.

Tensor decomposition has been used successfully in many applications involving multi-dimensional data, such as in movie recommendation systems (e.g. the Netflix challenge), other sensor fusion applications, chemometrics, and social network activity analysis, among others. Existing tensor decomposition methods operate by fitting multi-linear models to the measured data using a mean-squared-error fitting metric and some form of gradient descent such as nonlinear least-squares (NLS). The ICAT method is the first to decompose tensors using a completely different metric based on maximizing the statistical independence of the tensor mode factors. Using ICA enables ICAT to extract weak signals in interference since, unlike least-square error measures, statistical independence measures are insensitive to the relative amplitudes of signal components. ICAT is also much faster than the state-of-the-art, because the small relative effects of weak signals on gradients slows down the state-of-the-art methods. The fact that it is non-iterative also reduces the computation time. ICAT has greatly reduced memory requirements, because only the measured part of the tensor, not the full tensor, needs to be represented during computations. This is because ICAT calculates the tensor mode factor vectors directly from the measured data without loading the full tensor into memory before operating on it, as existing methods do.

Figure 3:
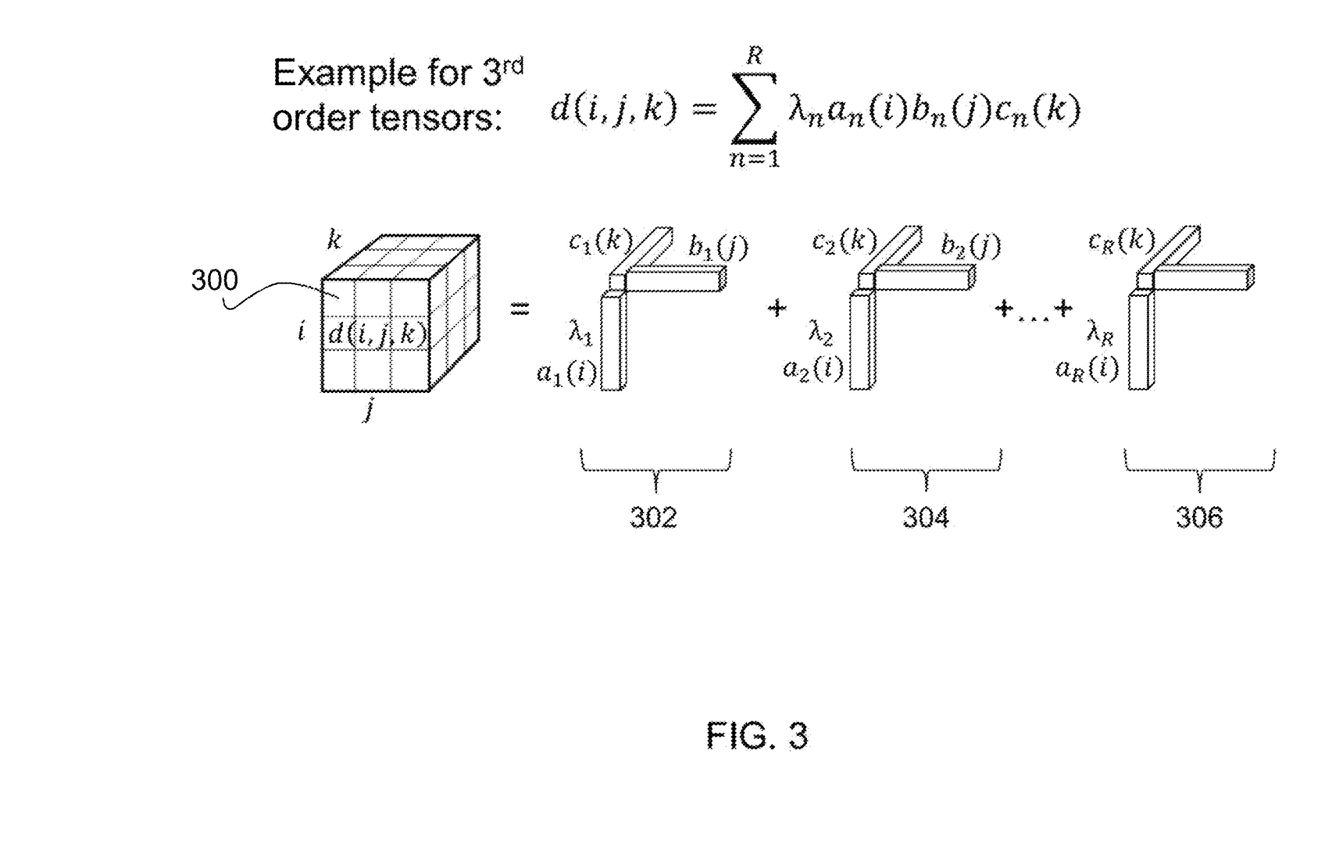
FIG. 3 is an illustration of canonical polyadic decomposition of tensors into factors according to some embodiments of the present disclosure.

ICAT is based on the standard canonical polyadic decomposition (CPD) form of tensor decomposition shown in FIG. 3. Specifically, FIG. 3 illustrates canonical polyadic decomposition of tensors into factors (CPD), revealing structure in tensors which ICAP uses for denoising, data completion, and signal extraction. In analogy to singular-value decomposition (SVD) decomposition of matrices, CPD decomposes a tensor 300 into a weighted sum of R tensor factors 302, 304, and 306, each of which is given by an outer product of D tensor mode factors or vectors where D is the tensor order or dimensionality and R is the rank of the tensor. A smaller R indicates more structure in the data since the CPD representation has only RDN parameters compared to $N^D$ parameters for a D-order tensor with N elements per mode. If some mild conditions on the tensor are met, the decomposition is guaranteed to be unique, which is not the case for matrix decompositions.

Figure 4:
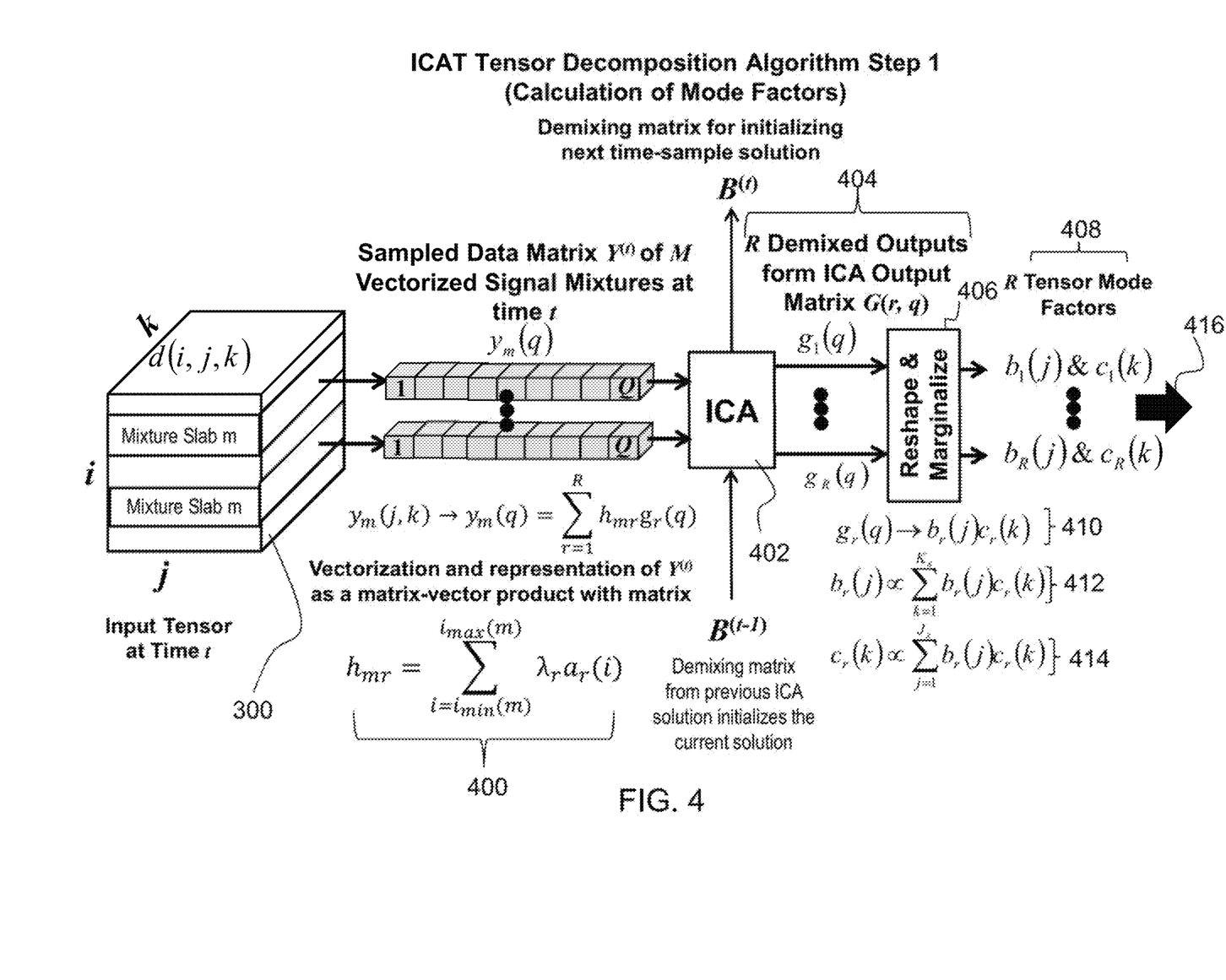
FIG. 4 is an illustration of Step 1 of the independent component analysis of tensors (ICAT) algorithm extracting tensor mode factors according to some embodiments of the present disclosure.

Unlike existing methods, ICAT uses statistical independence to decompose tensors into the CPD representation. It includes the two main steps shown in FIGS. 4 and 5 using a tensor with three modes or dimensions for ease of illustration. FIG. 4 depicts Step 1 of the ICAT algorithm, which extracts the tensor mode factors. In this example for a third-order tensor (element 300), three-dimensional (3D) slabs of the tensor (slices with thickness greater than 1) are sampled and integrated along one mode to form two-dimensional (2D) tensor slices. In the Reshape & Marginalize block (element 406), the 2D slices are vectorized or turned into one-dimensional (1D) signals (element 400) by concatenating rows and used as inputs to ICA (element 402) for demixing into tensor mode factors. The R demixed outputs (element 404) of ICA are reformatted or reshaped back into 2D slices by dividing the 1D signals into rows and stacking them, summed (integrated) along the k dimension (marginalized), and normalized to determine the $b_n(j)$ mode factors. The 2D slices are then marginalized along the j dimension and normalized to determine the $c_n(k)$ mode factors. The same process is repeated using mixture slices orthogonal to the first set to extract the $a_n(i)$ and $c_n(k)$ mode factors. While 3D slabs and tensors are used here as examples, the method can be used on slabs and tensors of any dimensionality. The slabs can also be sparse subsamples of the tensor as long as at least R slices are measured for each tensor mode and each slice has enough data samples for ICA to converge.

To reiterate, in the first step, 2D horizontal slices in the second and third modes of the tensor 300 are converted or reshaped into 1D vectors 400 and used as signal mixtures for input to ICA 402. Each of the R demixed outputs 404 of ICA is then converted or reshaped back to a 2D slice format. The n-th output of ICA is then a rank-1 matrix that is the outer-product of the factors for tensor mode n. Referring to element 406, "reshaping" is the conversion of the 2D matrix to a 1D vector (or vice versa). "Marginalization" is integrating the 2D slice or matrix along one dimension to form a 1D vector. Equation 410 represents reshaping ICA outputs into matrices, equation 412 represents estimating mode factors $b_r(j)$ by marginalizing matrices in k, and equation 414 represents estimating mode factors $c_r(k)$ by marginalizing matrices in j. By integrating the rank-1 matrix along each dimension (marginalizing) and normalizing the resulting vectors by their maximum values, the matrix can be separated into factors 408 for the second and third modes ($b_n$ and $c_n$). These two mode factors 408 are automatically correctly assigned to tensor factors because they were both part of the same demixing operation.

Figure 5:
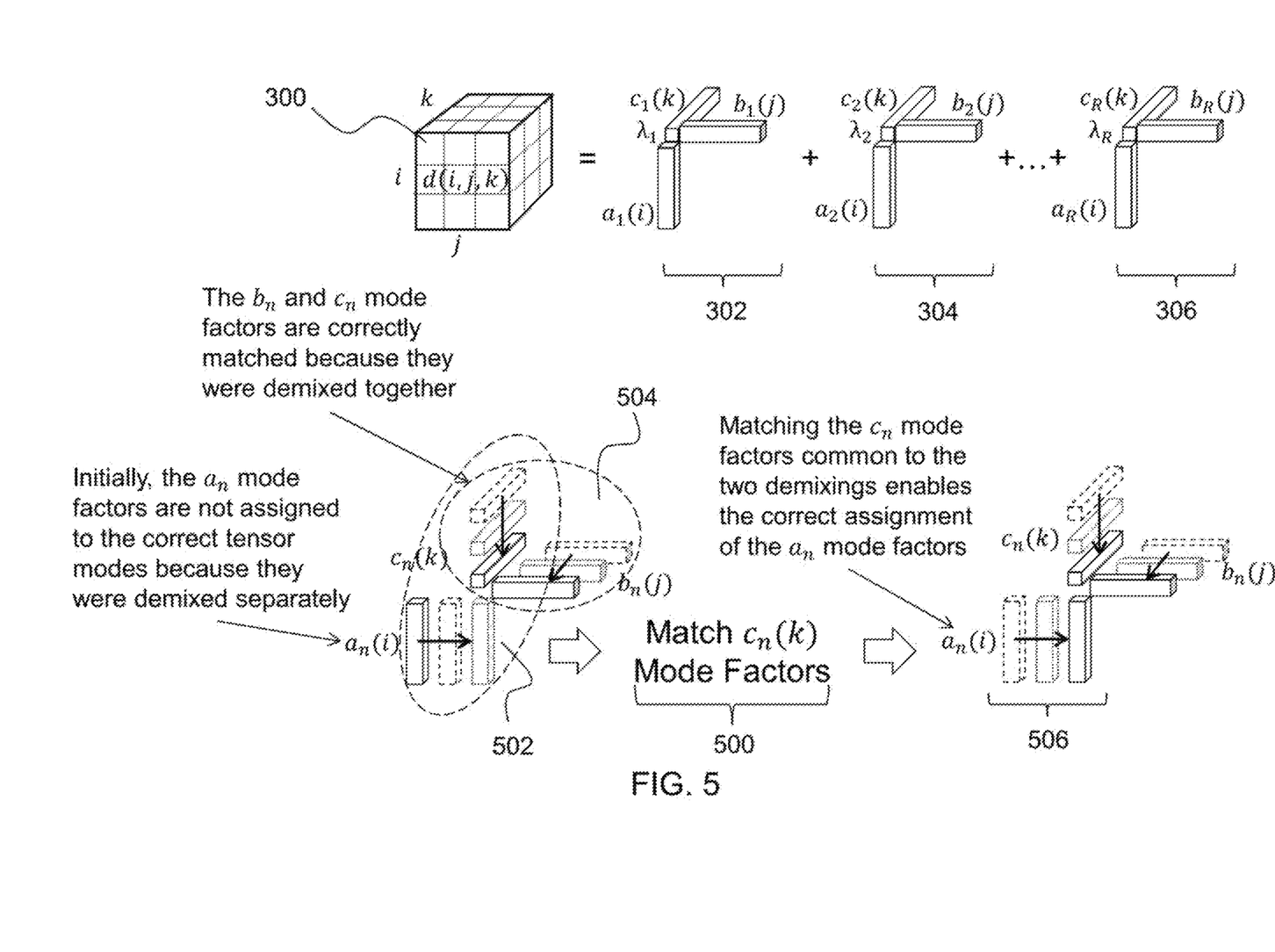
FIG. 5 is an illustration of Step 2 of the ICAT algorithm, which resolves the ICA permutation ambiguity, assigns the mode factors to the correct tensor factors, and calculates the tensor factor weights according to some embodiments of the present disclosure.

Next, the factors for the first mode ($a_n$) need to be determined. The first and third mode factors can be determined in the same way as before but by using vertical instead of horizontal slices of the tensor as mixture inputs to ICA. However, since the ordering of ICA outputs is indeterminate and the factors for the first mode were determined in a separate demixing operation, the demixed first mode factors $a_n$ still need to be assigned to the correct tensor factor. The naïve approach is to search for the best ordering of the $a_n$ mode factors that minimizes the reconstruction error, but this would involve R! comparisons, which quickly explodes and does not scale well with increasing rank R. Element 416 leads to transitive mode matching and tensor factor weight calculation steps (FIG. 5)

ICAT uses the transitive matching method described in U.S. application Ser. No. 16/034,780 to assign the $a_n$ mode factors to the correct tensor factors. FIG. 5 depicts Step 2 of the ICAT algorithm, which resolves the ICA permutation ambiguity, assigns the mode factors to the correct tensor factors, and calculates the tensor factor weights $\lambda_r$ shown in FIG. 5. The solution is to use the $c_n$ mode factors, which are common to both of the demixing operations, to find the correct $a_n$ mode assignments. The algorithm searches for the best matches of the $c_n$ mode factors 500 between the two demixings 502 and 504 for each of the R tensor mode factors. The $a_n$ 506 associated with the matching $c_n$ is then assigned to the tensor factor with the matching $c_n$ and its associated $b_n$. This requires only RD(D−1) vector matching operations instead of R!, where R and D are the tensor rank and order, respectively, which is a huge reduction in computational complexity for high rank tensors. Once the mode factors have been correctly assigned, the tensor weight factors $\lambda_r$ can be calculated by setting up a system of linear equations using the CPD representation and a subset of the measured tensor values. The linear equations can then be solved for the $\lambda_r$ using standard methods such as the matrix pseudo-inverse, as described in U.S. application Ser. No. 16/034,780, which is hereby incorporated by reference as though fully set forth herein. The subset of tensor values can be selected randomly or using value-weighted sampling methods.

Figure 6:
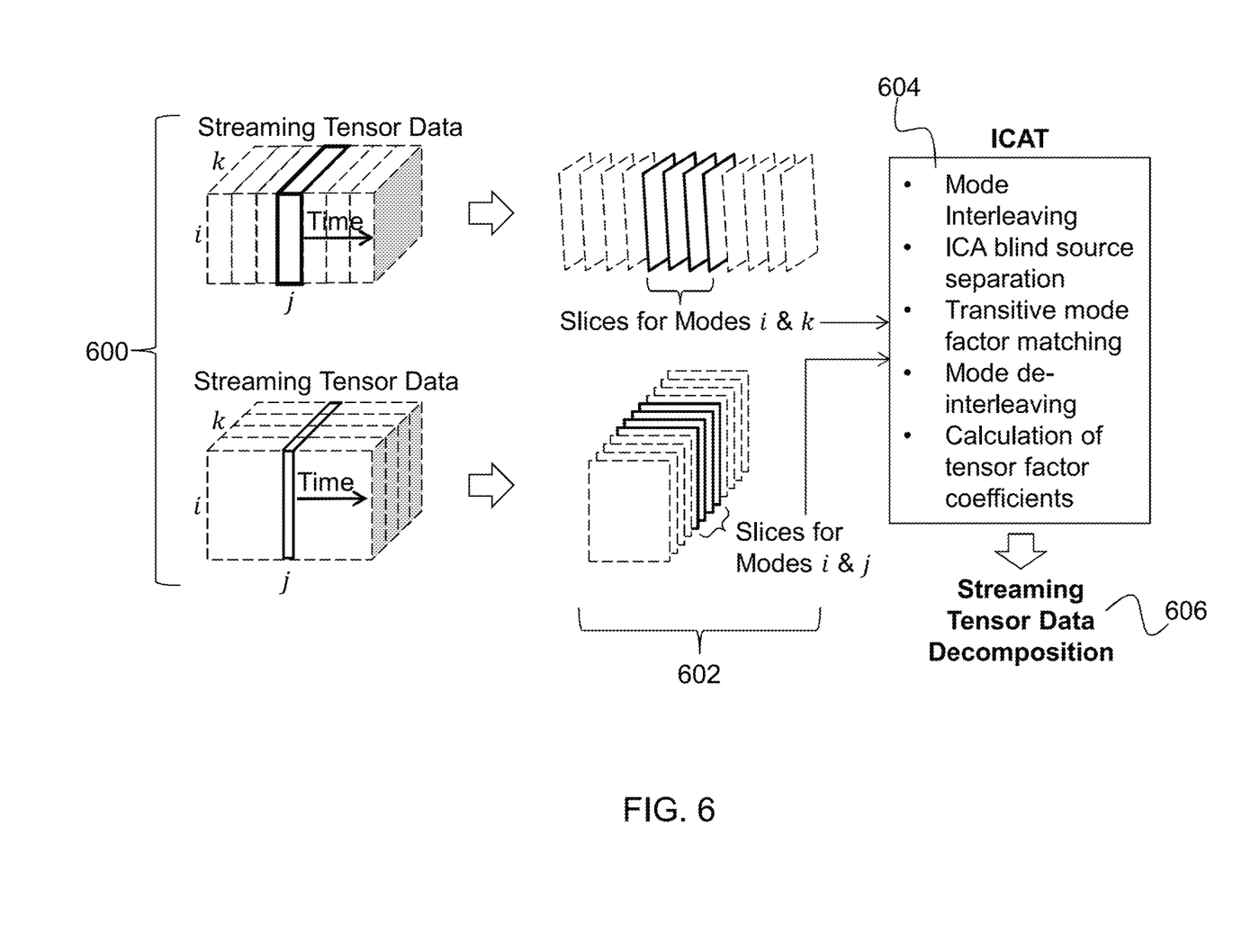
FIG. 6 is an illustration of online ICAT tensor slice sampling of streaming tensor data according to some embodiments of the present disclosure.

Many important applications of tensor decomposition require continuous online updating of solutions for streaming data, such as the flow of traffic on computer networks. The ICAT algorithm as described above and in U.S. application Ser. No. 16/034,780 is designed for analyzing static tensors. In order to handle streaming data efficiently, the system described herein is a pipelined version of ICAT for streaming tensor data in which the mixture slices are stored in pipelines and shifted in time, as shown in FIG. 6, which depicts online ICAT tensor slice sampling of streaming tensor data. A data pipeline is a set of data processing elements connected in series, where the output of one element is the input of the next one. The elements of a pipeline are often executed in parallel or in a time-sliced manner.

Figure 7:
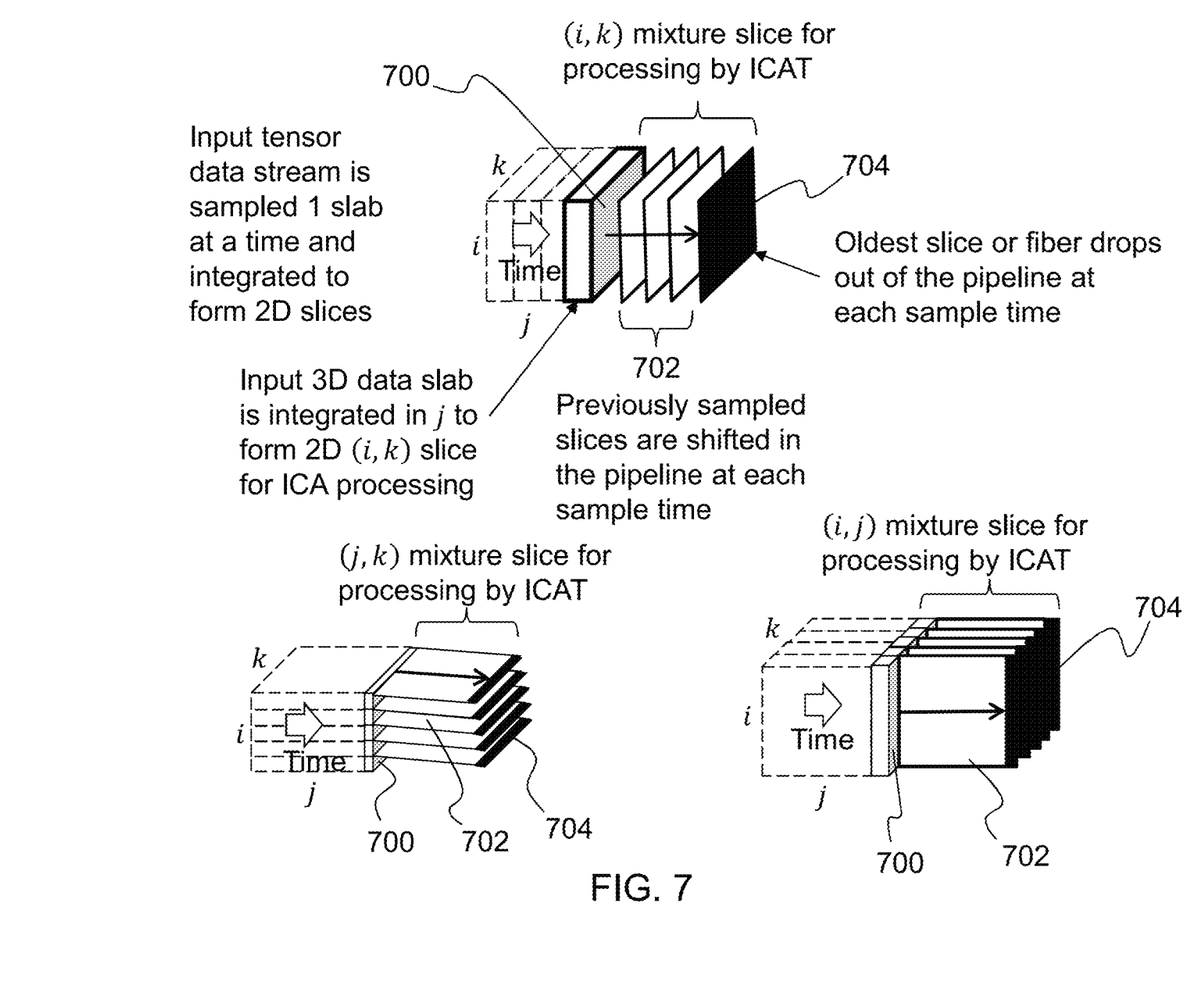
FIG. 7 is an illustration of tensor slice time sampling for streaming ICAT tensor decomposition according to some embodiments of the present disclosure.

A set of parallel pipelines 600 for 2D slices 602 of the tensor in different orientations is updated at each time step. At each time step, the first slice is replaced with a new sampling of the data, depending on the orientation of the slice. The slices already in the pipeline are shifted by one increment, and the last slice in the pipeline drops out and is replaced by the next oldest slice. This data shifting is illustrated in FIG. 7 using a third-order tensor as an example. FIG. 7 depicts the newly sampled slices 700, existing slices that shift down the pipeline 702, and the oldest slice that drops out 704. At each time increment, the updated set of tensor slices in different orientations are used by ICAT 604 (FIG. 6) to update the tensor mode factors and streaming tensor data decomposition 606 (FIG. 6) at each time step using the processes in FIGS. 4 and 5. Streaming ICAT 604 handles streaming data using continuous cycles of ICA demixing, transitive matching, and mode factor weight calculation as the tensor samples move through the pipelines.

Figure 8:
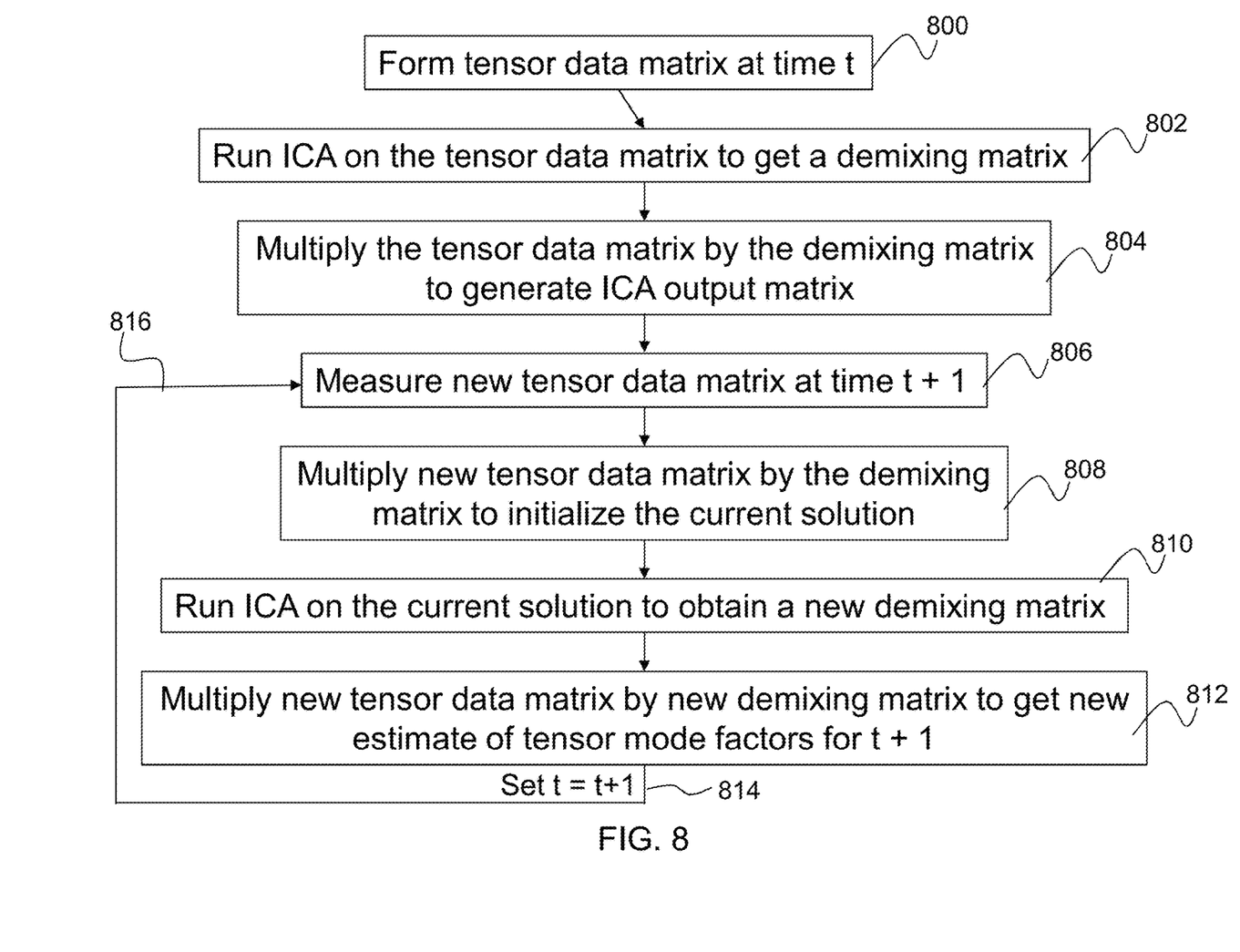
FIG. 8 is a flow diagram illustrating streaming data tensor analysis according to some embodiments of the present disclosure.

If the ICA algorithm being used is one that converges iteratively on the solution, such as algorithms that use gradient descent, then the update rate for ICA demixing of factors can be increased in the current ICA cycle by multiplying the newly sampled data by the previous demixing matrix. This preprocessing will partially demix the data, which will reduce the time for demixing in the current cycle because the previous solution is a good initialization that is close to the current solution. Initialization using an approximately correct solution will not help the execution time of non-iterative ICA methods such as JADE that do not have a initialization step and always calculate solutions "from scratch". This iterative ICA can be used in streaming mode ICAT using the following steps, which are also shown in the flow diagram of FIG. 8:

1. Form tensor data matrix $Y^{(t)}$ at time t from sampled slices of data tensor D (element 800).
2. Run ICA on $Y^{(t)}$ to generate demixing matrix $B^{(t)}$ (element 802).
3. Multiply $Y^{(t)}$ by $B^{(t)}$ to generate ICA output matrix $G^{(t)}$, reshape and marginalize $G^{(t)}$, perform transitive mode matching, and calculate tensor factor weights $\lambda_r$ to create CPD representation of D for time t (element 804). The method for calculating the tensor factor weights is described in detail in U.S. application Ser. No. 16/034,780. Using the tensor factor weight calculations for sensor data reconstruction is equivalent to calculating the CPD tensor representation in FIG. 3, where the streaming tensor data can consist of streaming sensor data.
4. Measure new data matrix $Y^{(t+1)}$ formed from slices of tensor D at time t+1 (element 806).
5. Multiply $Y^{(t+1)}$ by previous demixing matrix $B^{(t)}$ to initialize the current ICA solution for $Y^{(t+1)}$ (element 808).
6. Run ICA on $Y^{(t+1)}$ to generate new demixing matrix $B^{(t+1)}$ (element 810).
7. Multiply $Y^{(t+1)}$ by $B^{(t+1)}$ to generate ICA output matrix $G^{(t+1)}$, reshape and marginalize $G^{(t+1)}$, perform transitive mode matching, and calculate tensor factor weights $\lambda_r$ to create CPD representation of D for time t+1 (element 812).
8. Set t=t+1 (element 814).
9. Go to Step 4 and repeat for next sliding window of data (element 816).

Note that since ICA is insensitive to the ordering of data in the rows of Y as long as the ordering is consistent across rows, $B^{(t)}$ can be used on $Y^{(t+1)}$ even though the positions of data elements in each row of Y have changed due to the streaming of data.

ICAT can be applied to any sensing application which involves the fusion of multiple sensor data streams. For example, it is expected to be useful for fusion of the multiple sensors used in vehicles, including denoising of data, extraction of useful features, and reconstruction of missing data. For example, the missing or hidden data that is extracted can be detection and recognition of objects, such as vehicles, pedestrians, and traffic signs, under different weather conditions (e.g., rain, snow, fog) and lighting conditions (e.g., low light, bright light). The extracted hidden data can then be utilized to cause an automatic operation related to controlling a component of the autonomous vehicle. Yet another application is analysis of traffic on computer networks for detection of anomalies and cyberattacks.

Figure 9:
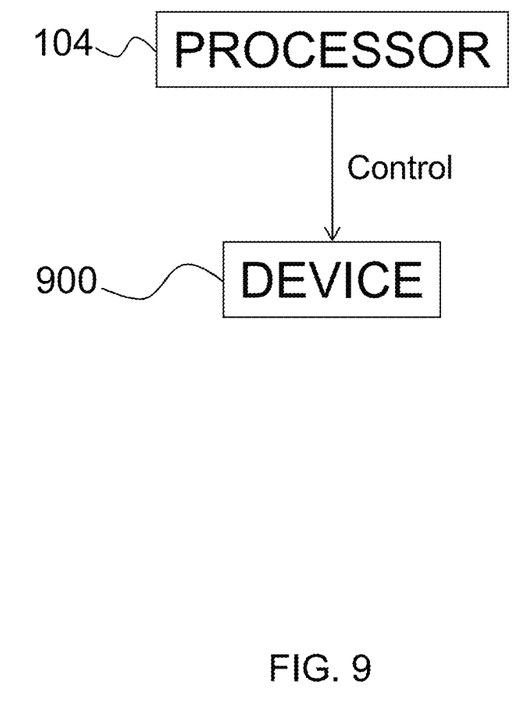
FIG. 9 is a flow diagram providing an illustration of controlling a device using hidden data extracted using ICAT according to some embodiments of the present disclosure.

FIG. 9 is a flow diagram providing an illustration of controlling a device 900 using hidden data extracted using ICAT according to some embodiments of the present disclosure. Non-limiting examples of devices 900 that can be controlled via the processor 104 include a motor vehicle or a motor vehicle component (electrical, non-electrical, mechanical), such as a brake, a steering mechanism, suspension, or safety device (e.g., airbags, seatbelt tensioners, etc.). Further, the vehicle could be an unmanned aerial vehicle (UAV), an autonomous self-driving ground vehicle, or a human operated vehicle controlled either by a driver or by a remote operator. For instance, upon object detection (e.g., based on the hidden data) and recognition, the system can cause the autonomous vehicle to perform a driving operation/maneuver (such as steering or another command) in line with driving parameters in accordance with the recognized object. For example, if the system recognizes a bicyclist, another vehicle, or a pedestrian, the system described herein can cause a vehicle maneuver/operation to be performed to avoid a collision with the bicyclist or vehicle (or any other object that should be avoided while driving). The system can cause the autonomous vehicle to apply a functional movement response, such as a braking operation followed by a steering operation, to redirect the vehicle away from the object, thereby avoiding a collision.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular object detected and the circumstances in which the system is implemented. For instance, the method can be applied to border security (e.g., detecting smugglers at night), intelligence, surveillance, and reconnaissance (ISR), drones, autonomous vehicles, and perception and safety in autonomous systems (e.g., detecting humans interacting with robots in a manufacturing environment).

Another application of the invention described herein is fusion of multiple body-mounted sensors for human activities and conditions. Non-limiting examples of sensors include blood pressure sensors, pulse sensors, electromyogram (EMG) sensors, temperature sensors, electroencephalogram (EEG) sensors, accelerometers, gyroscopes, pedometers, and pressure sensors. For example, detection of activities from extracted hidden data, such as reduced rate of walking, combined with biometric measures, such as heart rates at certain times of the day, could be used to infer the health condition of a human. As an example, reduced movement combined with detected high blood pressure could indicate a potential stroke. Based on this detection, a text message, email, or audible alert could be sent to the human via a smartwatch, smartphone, or other mobile device. The message/alert can provide instructions to the human to go to the hospital or rest (e.g., sit down, lie down), for instance. In this example, the device 900 controlled by the processor 104 that obtains the extracted hidden data according to embodiments of the present disclosure is a mobile device (smartwatch, smartphone, mobile phone) or personal computer comprising a display, and the display presents instructions for at least one action for the user to perform.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for controlling a device based on streaming data analysis using blind source separation, the system comprising:

one or more processors, and a non-transitory computer-readable medium having executable instructions encoded thereon such that when executed, the one or more processors perform operations of:

at each time step, updating a set of parallel processing pipelines for two-dimensional (2D) tensor slices of streaming tensor data in different orientations, wherein the streaming tensor data comprises incomplete sensor data, where in updating the set of parallel processing pipelines, replacing a first tensor slice with a new tensor slice resulting in an updated set of tensor slices in different orientations;

at each time step, performing a cycle of demixing of the updated set of tensor slices in different orientations, transitive matching of the updated set of tensor slices, and tensor factor weight calculations on the updated set of tensor slices;

using the tensor factor weight calculations for sensor data reconstruction;

based on the sensor data reconstruction, extracting hidden sensor data; and upon recognition of an object in the extracted hidden sensor data, causing the device to perform a maneuver to avoid a collision with the object.

2. The system as set forth in claim 1, where in performing the cycle of demixing, transitive matching, and tensor factor weight calculations, the one or more processors perform operations of:

demixing the tensor slices into demixed outputs;

converting the demixed outputs back into tensor slices, and decomposing the tensor slices into mode factors using matrix decomposition;

repeating operations of processing the tensor slices and converting the demixed outputs until mode factors are determined for all of the tensor modes;

assigning the mode factors to tensor factors by matching mode factors common to two or more demixings;

using the assigned mode factors, determining tensor factor weight values;

using the tensor factor weight values, combining the tensor factors for the sensor data reconstruction.

3. The system as set forth in claim 2, wherein the tensor factor weight values are determined by setting up a system of linear equations using sensor data and solving for the tensor weight factors.

4. The system as set forth in claim 1, wherein a rate of demixing is increased by multiplying newly sampled streaming tensor data by a previous demixing matrix.

5. The system as set forth in claim 1, where in updating the set of parallel processing pipelines, the one or more processors further perform operations of:

measuring a tensor data matrix at time t over a sliding time window;

running a blind source separation algorithm on the tensor data matrix to obtain a demixing matrix;

generating an estimate of tensor mode factors for time t by multiplying the tensor data matrix by the demixing matrix;

measuring a new tensor data matrix at time t+1;

initializing a current solution by multiplying the new tensor data matrix by the demixing matrix;

running a blind source separation algorithm on the current solution to obtain a new demixing matrix; and generating a new estimate of tensor mode factors for time t+1 by multiplying the new tensor data matrix by the new demixing matrix.

6. The system as set forth in claim 5, wherein the blind source separation algorithm is independent component analysis (ICA).

7. A computer implemented method for controlling a device based on streaming data analysis using blind source separation, the method comprising an act of:

causing one or more processors to execute instructions encoded on a non-transitory computer-readable medium, such that upon execution, the one or more processors perform operations of:

at each time step, updating a set of parallel processing pipelines for two-dimensional (2D) tensor slices of streaming tensor data in different orientations, wherein the streaming tensor data comprises incomplete sensor data, where in updating the set of parallel processing pipelines, replacing a first tensor slice with a new tensor slice resulting in an updated set of tensor slices in different orientations;

at each time step, performing a cycle of demixing of the updated set of tensor slices in different orientations, transitive matching of the updated set of tensor slices, and tensor factor weight calculations on the updated set of tensor slices;

using the tensor factor weight calculations for sensor data reconstruction;

based on the sensor data reconstruction, extracting hidden sensor data; and upon recognition of an object in the extracted hidden sensor data, causing the device to perform a maneuver to avoid a collision with the object.

8. The method as set forth in claim 7, where in performing the cycle of demixing, transitive matching, and tensor factor weight calculations, the one or more processors perform operations of:

demixing the tensor slices into demixed outputs;

converting the demixed outputs back into tensor slices, and decomposing the tensor slices into mode factors using matrix decomposition;

repeating operations of processing the tensor slices and converting the demixed outputs until mode factors are determined for all of the tensor modes;

assigning the mode factors to tensor factors by matching mode factors common to two or more demixings;

using the assigned mode factors, determining tensor factor weight values;

using the tensor factor weight values, combining the tensor factors for the sensor data reconstruction.

9. The method as set forth in claim 8, wherein the tensor factor weight values are determined by setting up a system of linear equations using sensor data and solving for the tensor weight factors.

10. The method as set forth in claim 7, wherein a rate of demixing is increased by multiplying newly sampled streaming tensor data by a previous demixing matrix.

11. The method as set forth in claim 7, where in updating the set of parallel processing pipelines, the one or more processors further perform operations of:

measuring a tensor data matrix at time t over a sliding time window;

running a blind source separation algorithm on the tensor data matrix to obtain a demixing matrix;

generating an estimate of tensor mode factors for time t by multiplying the tensor data matrix by the demixing matrix;

measuring a new tensor data matrix at time t+1;

initializing a current solution by multiplying the new tensor data matrix by the demixing matrix;

running a blind source separation algorithm on the current solution to obtain a new demixing matrix; and generating a new estimate of tensor mode factors for time t+1 by multiplying the new tensor data matrix by the new demixing matrix.

12. The method as set forth in claim 11, wherein the blind source separation algorithm is independent component analysis (ICA).

13. A computer program product for controlling a device based on streaming data analysis using blind source separation, the computer program product comprising:

computer-readable instructions stored on a non-transitory computer-readable medium that are executable by a computer having one or more processors for causing the processor to perform operations of:

at each time step, updating a set of parallel processing pipelines for two-dimensional (2D) tensor slices of streaming tensor data in different orientations, wherein the streaming tensor data comprises incomplete sensor data, where in updating the set of parallel processing pipelines, replacing a first tensor slice with a new tensor slice resulting in an updated set of tensor slices in different orientations;

at each time step, performing a cycle of demixing of the updated set of tensor slices in different orientations, transitive matching of the updated set of tensor slices, and tensor factor weight calculations on the updated set of tensor slices;

using the tensor factor weight calculations for sensor data reconstruction;

based on the sensor data reconstruction, extracting hidden sensor data; and upon recognition of an object in the extracted hidden sensor data, causing the device to perform a maneuver to avoid a collision with the object.

14. The computer program product as set forth in claim 13, where in performing the cycle of demixing, transitive matching, and tensor factor weight calculations, the one or more processors perform operations of:

demixing the tensor slices into demixed outputs;

converting the demixed outputs back into tensor slices, and decomposing the tensor slices into mode factors using matrix decomposition;

repeating operations of processing the tensor slices and converting the demixed outputs until mode factors are determined for all of the tensor modes;

assigning the mode factors to tensor factors by matching mode factors common to two or more demixings;

using the assigned mode factors, determining tensor factor weight values;

using the tensor factor weight values, combining the tensor factors for the sensor data reconstruction.

15. The computer program product as set forth in claim 14, wherein the tensor factor weight values are determined by setting up a system of linear equations using sensor data and solving for the tensor weight factors.

16. The computer program product as set forth in claim 13, wherein a rate of demixing is increased by multiplying newly sampled streaming tensor data by a previous demixing matrix.

17. The computer program product as set forth in claim 13, where in updating the set of parallel processing pipelines, the one or more processors further perform operations of:

measuring a tensor data matrix at time t over a sliding time window;

running a blind source separation algorithm on the tensor data matrix to obtain a demixing matrix;

generating an estimate of tensor mode factors for time t by multiplying the tensor data matrix by the demixing matrix;

measuring a new tensor data matrix at time t+1;

initializing a current solution by multiplying the new tensor data matrix by the demixing matrix;

running a blind source separation algorithm on the current solution to obtain a new demixing matrix; and generating a new estimate of tensor mode factors for time t+1 by multiplying the new tensor data matrix by the new demixing matrix.

18. The computer program product as set forth in claim 17, wherein the blind source separation algorithm is independent component analysis (ICA).

* * * * *